United States Patent
Baird, Sr.

[19]

[11] Patent Number: 5,915,832
[45] Date of Patent: Jun. 29, 1999

[54] LIGHT-A-CUP

[76] Inventor: Andrew B. Baird, Sr., 816 N. Pearl, Centralia, Wash. 98531

[21] Appl. No.: 08/739,714

[22] Filed: Oct. 29, 1996

[51] Int. Cl.[6] .................................................. F21V 33/00
[52] U.S. Cl. ......................... 362/551; 362/101; 362/800; 362/253; 362/511
[58] Field of Search .................................. 362/101, 253, 362/234, 800, 806, 96, 32, 154, 80, 83.3

[56] References Cited

U.S. PATENT DOCUMENTS

| | | | |
|---|---|---|---|
| 5,119,279 | 6/1992 | Makowsky | 362/101 |
| 5,150,963 | 9/1992 | Hill | 362/101 |
| 5,575,553 | 11/1996 | Tipton | 362/101 |

*Primary Examiner*—Thomas M. Sember

[57] ABSTRACT

A beverage holder is a raised housing on a base, with sides, and a top with opening(s) designed to hold beverage container(s).

My beverage holder now incorporates lighting devices that will clearly illuminate the area(s) of desired usage in the beverage holder. This makes my new and improved beverage holder far superior to any previous beverage holder.

1 Claim, 8 Drawing Sheets

LIGHT-A-CUP

TECHNICAL FIELD

The present invention relates to beverage container holders in general. More particularly, the present invention relates to beverage container holders that include lights or other forms of illumination.

BACKGROUND OF THE INVENTION

Beverage container holders are in quite common usage. Beverage container holders are commonly used in all types of vehicles to hold beverage containers such as cups, glasses, cans or bottles. This allows a driver or passenger to drink a beverage leisurely while in a vehicle.

Beverages are drunk both day and night, and a beverage container holder loses the aspect of leisure when it cannot be seen. In dimly-lit or darkened times, it would be extremely helpful to utilize beverage container holders that have lights or other forms of illumination.

In addition, the use of lights can be a safety factor to the User(s). The employment of lights on a beverage container holder can further save the user money that may need to be spent on cleaning costs and/or repairs from accidents.

There are no U.S. patents issued, in the past, for illuminated beverage container holders.

SUMMARY OF THE INVENTION

The present invention is a beverage container holder that comprises a body having a raised housing on a base, with sides, a top with opening(s), a singular (or plurality) of light(s) positioned around or in the edge of the opening(s) for illumination of the opening(s), and a lead(s) to the power source which allows for the actuation of the singular (or plurality) of light(s) around the opening(s). The body may further include other openings for miscellaneous uses.

DETAILED DESCRIPTION OF PREFERRED EMBODIMENTS

Figure 1:
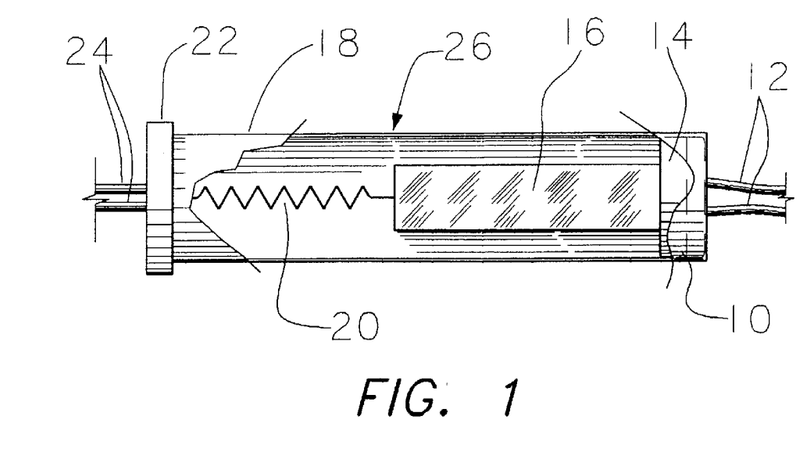
FIG. 1—is a cross-sectional view of the L.E.D. unit and its connections to power adaptor and fiber optic lead(s).

Referring to FIG. 1, there is shown at 26 the complete light/mirror/L.E.D./fiber optic unit in accordance with the preferred embodiment of the present invention. The light/mirror/L.E.D./fiber optic unit 26 comprises electronic leads 24, rear cover 22, outer case 18, resistor 20, L.E.D. 16, focusing mirror 14, front cover 10, and fiber optic leads 12. Electronic leads 24 are connected to a cigarette lighter power adaptor 28. FIG. 1 is attached to a beverage container holder console surface 34, (shown in FIG. 7). Power to operate the complete light/mirror/L.E.D. fiber optic unit 26 comes from the cigarette lighter power adaptor 28.

Figure 2:
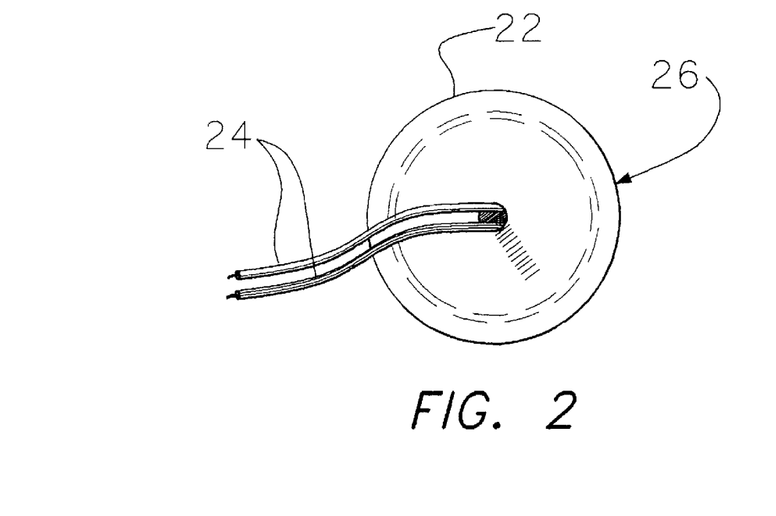
FIG. 2—is the anterior view of the power connection to the L.E.D. unit of FIG. 1.

FIG. 2 shows a rear view of the complete light/mirror/L.E.D./fiber optic unit 26 (shown in FIG. 1). The rear unit cover 22 is attached to the complete light/mirror/L.E.D./fiber optic unit 26 and the electronic leads 24 pass through the rear unit cover 26 and into the complete light/mirror/L.E.D./fiber optic 26 to supply the power to enable the complete light/mirror/L.E.D./fiber optic unit 26 to create light.

Figure 3:
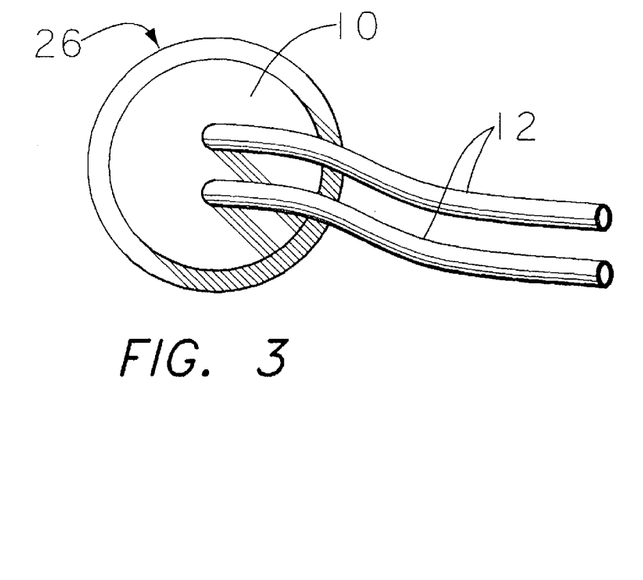
FIG. 3—is the frontal view showing where the fiber optic leads enter the unit of FIG. 1.

FIG. 3 shows a frontal view of the complete light/mirror/L.E.D./fiber optic unit 26 (shown in FIG. 1). The front cover unit 10 is attached to the complete light/mirror/L.E.D./fiber optic unit 26 and the fiber optic leads 12 pass through the front unit cover 10 and into the complete light/mirror/L.E.D./fiber optic unit 26 and direct the light created by the complete light/mirror/L.E.D./fiber optic unit 26 to the appropriate location.

Figure 4:
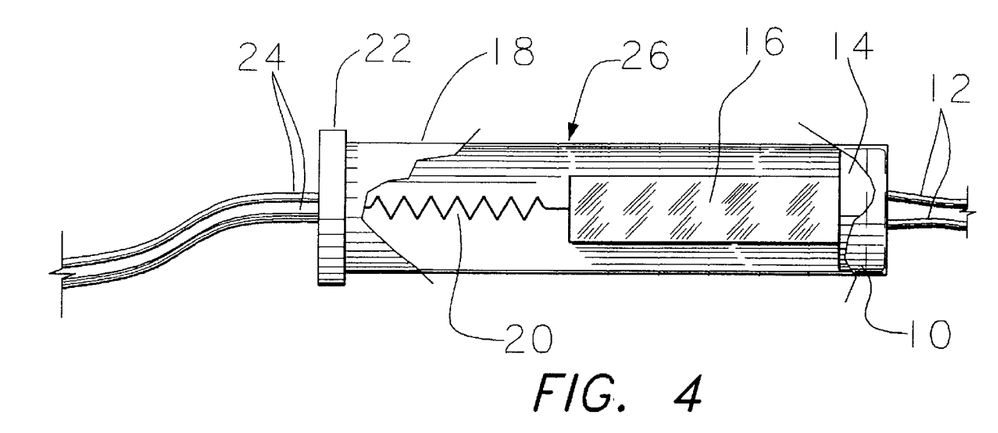
FIG. 4—is a view showing that direct wiring to power source is an alternative power supply to FIG. 1.

FIG. 4 shows at 26 the complete light/mirror/L.E.D./fiber optic unit. The light/mirror/L.E.D./fiber optic unit 26 comprises electronic leads 24, rear cover 22, outer case 18, resistor 20, L.E.D. 16, focusing mirror 14, front cover 10, and fiber optic leads 12. Electronic leads 24 are connected directly to the power source. FIG. 1 is attached to a beverage container holder console surface 34, (shown in FIG. 7). Power to operate the complete light/mirror/L.E.D. fiber optic unit 26 comes from the power source.

Figure 5:
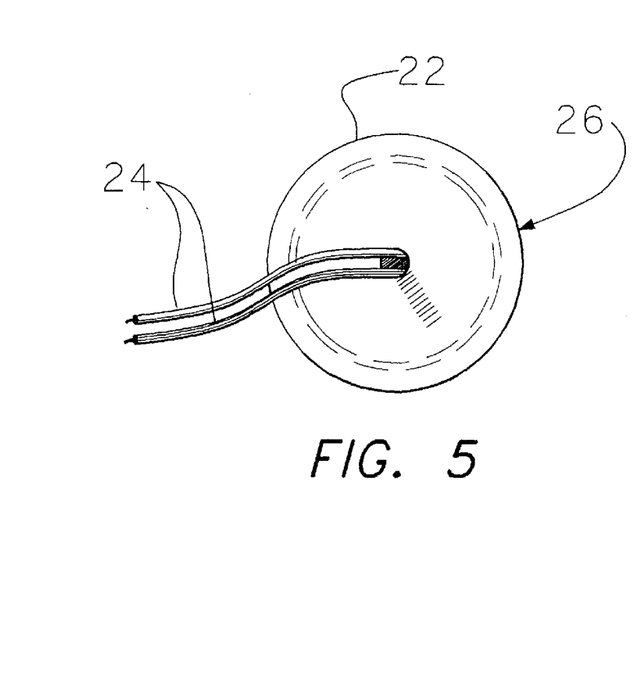
FIG. 5—is the anterior view of the power connection described in FIG. 4.

FIG. 5 shows a rear view of the complete light/mirror/L.E.D./fiber optic unit 26 (shown in FIG. 1). The rear unit cover 22 is attached to the complete light/mirror/L.E.D./ fiber optic unit 26 and the electronic leads 24 pass through the rear unit cover 26 and into the complete light/mirror/L.E.D./fiber optic 26 to supply the power to enable the complete light/mirror/L.E.D./fiber optic unit 26 to create light.

Figure 6:
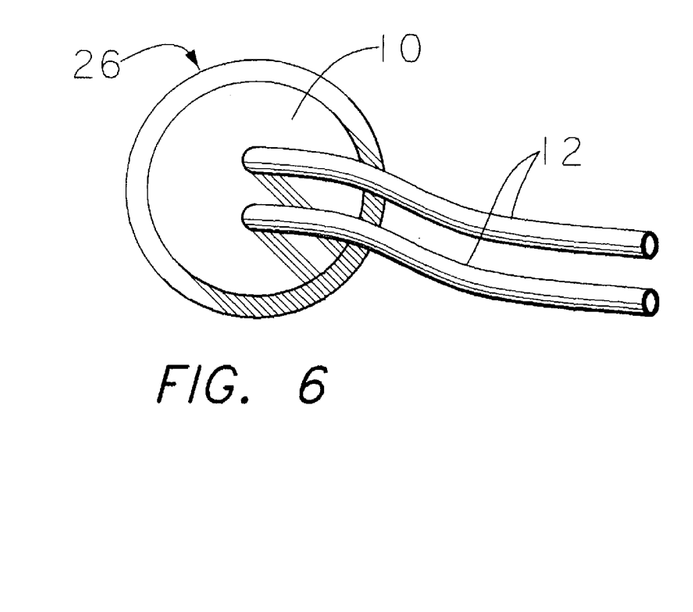
FIG. 6—is the frontal view showing where the fiber optic leads enter the direct-wired L.E.D. unit.

FIG. 6 shows a frontal view of the complete light/mirror/L.E.D./fiber optic unit 26 (shown in FIG. 1). The front cover unit 10 is attached to the complete light/mirror/L.E.D./fiber optic unit 26 and the fiber optic leads 12 pass through the front unit cover 10 and into the complete light/mirror/L.E.D./fiber optic unit 26 and direct the light created by the complete light/mirror/L.E.D./fiber optic unit 26 to the appropriate location.

Figure 7:
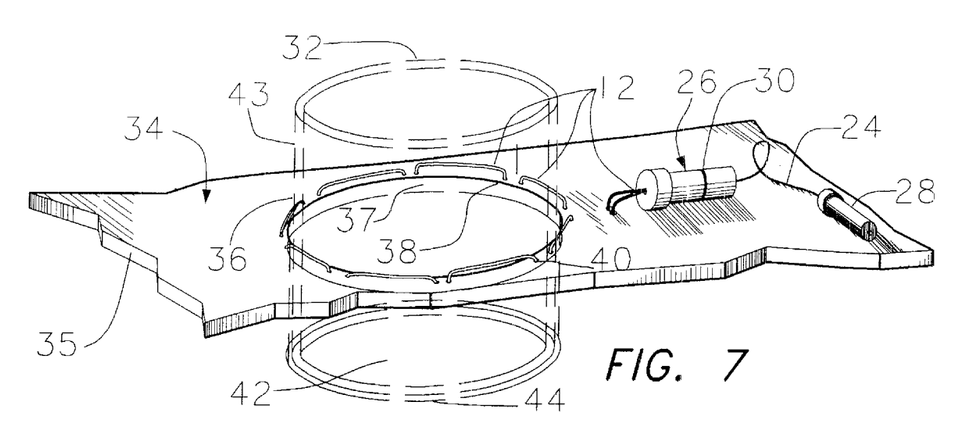
FIG. 7—is the prospective view showing a fiber optic cable woven through holes in the console.

FIG. 7 shows a complete light/mirror/L.E.D./fiber optic unit 26 with a cigarette lighter power adaptor 28 attached to a console surface 34 with a holddown 30. The fiber optic leads 12 are woven around the edge of the beverage container opening 38 through holes 40 in the console surface 34. The beverage container holder opening 37 is created by the edge of the beverage container holder 38, the inner side 43 and the bottom 38. The bottom of the beverage container 42 rests on the bottom of the beverage container holder 38 and the side of the beverage container 36 is held upright by the side of the beverage container holder 37. Thus the beverage container is held upright.

Figure 8:
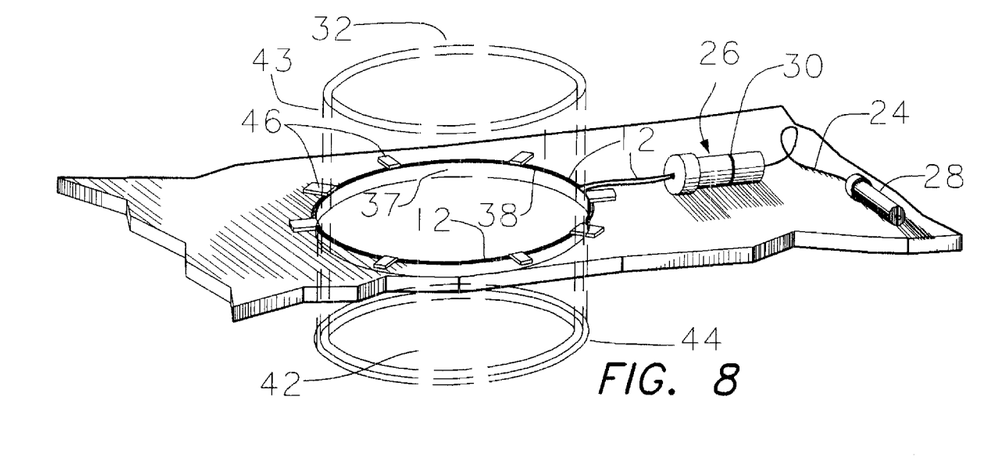
FIG. 8—is a prospective view showing fiber optic cable (s) held down by evenly spaced holddowns surrounding the opening.

FIG. 8 shows a complete light/mirror/L.E.D./fiber optic unit 26 with a cigarette lighter power adaptor 28 attached to a console surface 34 with a holddown 30.The fiber optic leads 12 are held down around the edge of the beverage container opening 38 by fiber optic holddowns 46 to the console surface 34. The beverage container holder opening 37 is created by the edge of the beverage container holder 38, the inner side 43 and the bottom 38. The bottom of the beverage container 42 rests on the bottom of the beverage container holder 38 and the side of the beverage container 36 is held upright by the side of the beverage container holder 37. Thus the beverage container is held upright.

Figure 9:
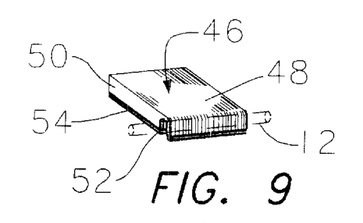
FIG. 9—is a blown up view of a fiber optic holddown using double-sided tape to secure it to console.

FIG. 9 is an enlarged view of a fiber optic holddown 46 showing an open channel 52 where the fiber optic lead 12 is secured around the edge of the beverage container holder opening 37. The fiber optic holddown 46 is secured to the console surface 34 by double-sided tape 54.

Figure 10:
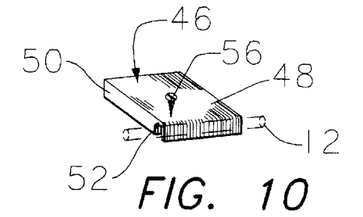
FIG. 10—is a blown up view of a fiber optic holddownusing a screw to secure it to console.

FIG. 10 is an enlarged view of a fiber optic holddown 46 showing an open channel 52 where the fiber optic lead 12 is secured around the edge of the beverage container holder opening 37. The fiber optic holddown 46 is secured to the console surface by a screw 56.

Figure 11:
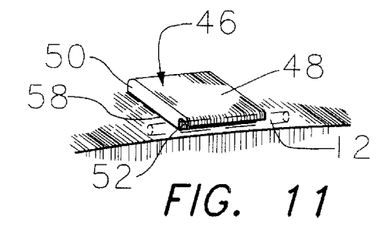
FIG. 11—is a blown up view of a fiber optic holddown using glue to secure it to console.

FIG. 11 is an enlarged view of a fiber optic holddown 46 showing an open channel 52 where the fiber optic lead 12 is secured around the edge of the beverage container holder opening 37. The fiber optic holddown 46 is secured to the console surface by glue 58.

Figure 12:
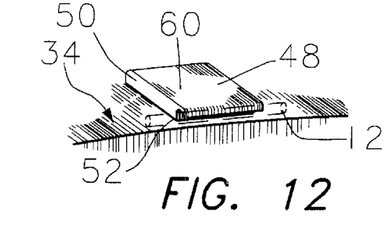
FIG. 12—is a blown up view of a fiber optic holddown molded to console.

FIG. 12 is an enlarged view of a fiber optic holddown 46 showing an open channel 52 where the fiber optic lead 12 is secured around the edge of the beverage container holder opening 37. The fiber optic holddown 60 is molded to the console surface 34.

Figure 13:
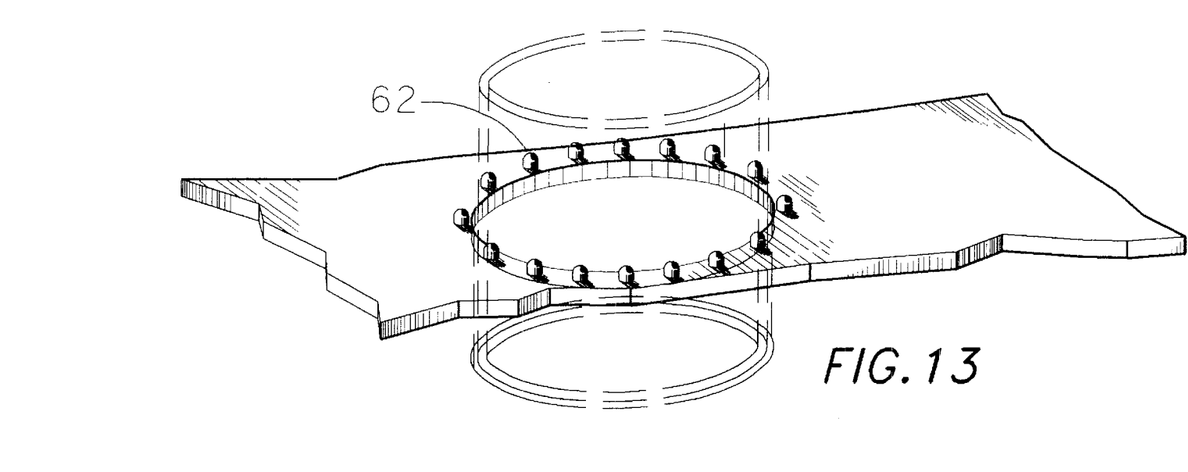
FIG. 13—is a prospective view showing a variation of the light source using small incandescent lights or L.E.D.s surrounding the opening.

FIG. 13 shows an alternative light source. Around the beverage container holder edge 38 are small incandescent lights 62 coming directly through holes 40 in the console surface 34 around the edge of the beverage container holder opening 38.

Figure 14:
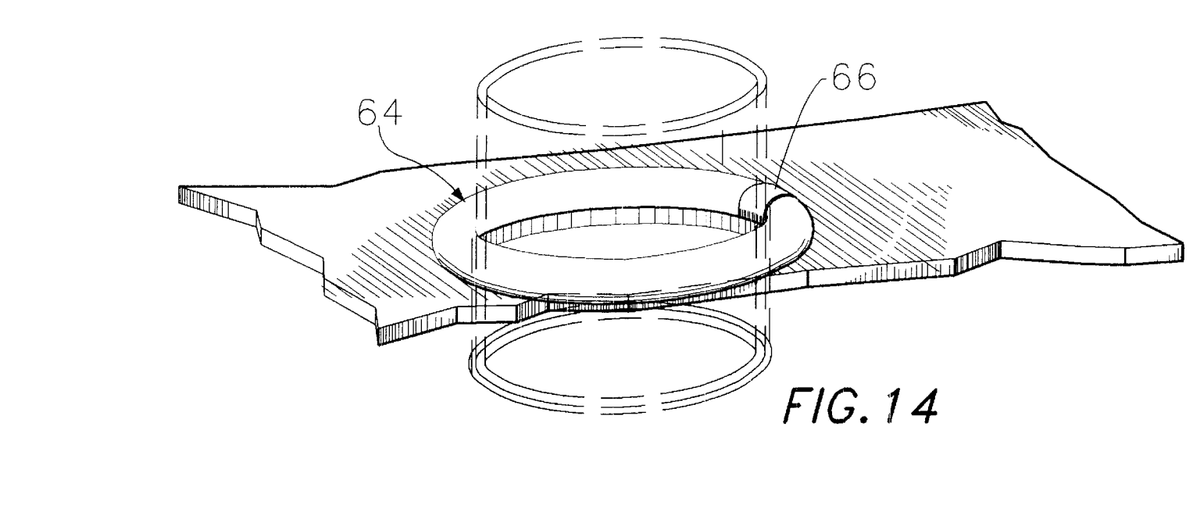
FIG. 14—is a prospective view showing a circular fluorescent tube as a variation of the light source.

FIG. 14 shows an alternative light source. Around the beverage container holder edge 38 is a circular fluorescent tube 64, connected by a plug-in 66 to a power source (not shown).

Figure 15:
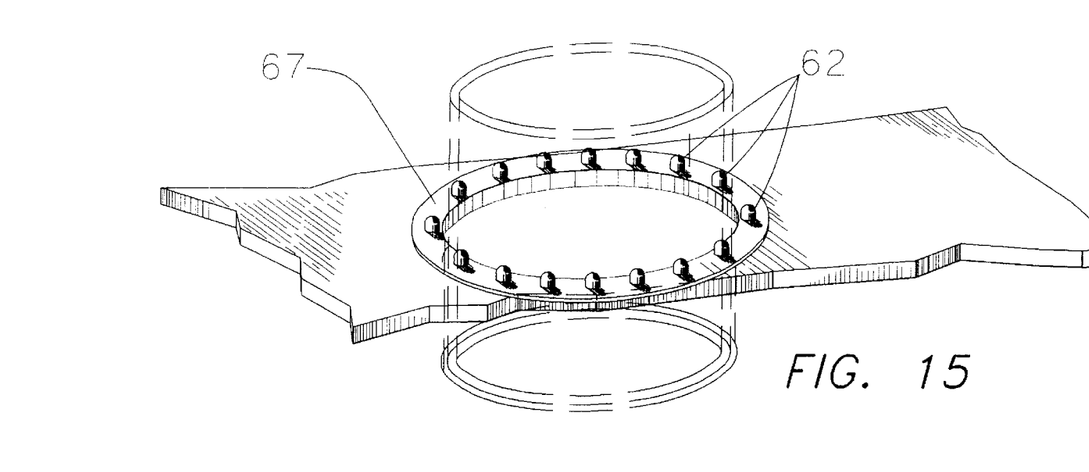
FIG. 15—is a prospective view showing a ring base under the incandescent light source shown in FIG. 13.

FIG. 15 shows an alternative light source. Around the beverage container holder edge 38 are small incandescent lights 62 mounted on a ring base 67.

Figure 16:
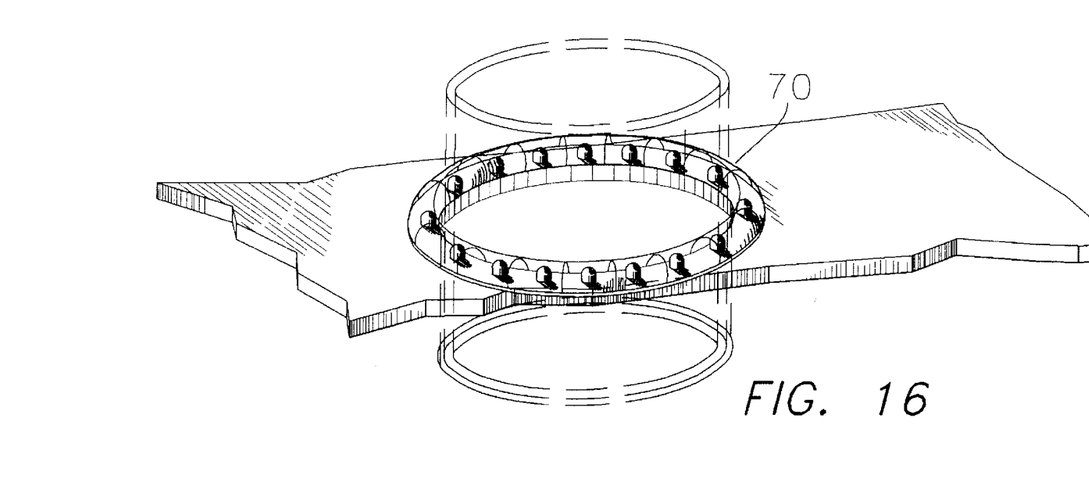
FIG. 16—is a prospective view showing a plastic cover over the incandescent lights shown in FIG. 13.

FIG. 16 shows an alternative light source. Around the beverage container holder edge 38 are small incandescent lights 62 mounted on a ring base 67 and enclosed within a clear plastic cover 70.

Figure 17:
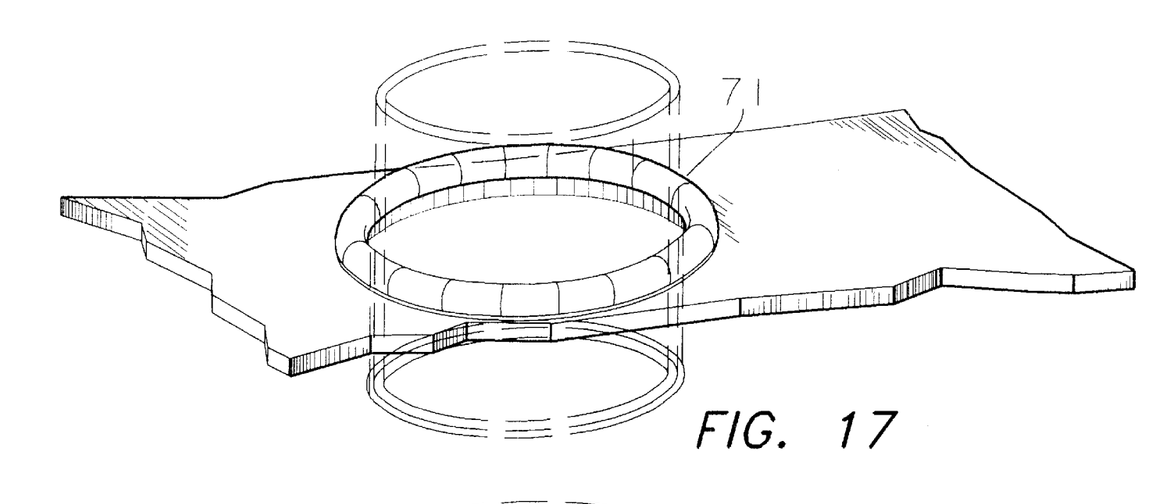
FIG. 17—is a prospective view showing a tube filled with a fluoresing liquid (or gas) that lights when electrically charged as a variation of the light source.

FIG. 17 shows an alternative light source. Around the beverage container holder edge 38 is a tube filled with a liquid that fluoresces when excited by an electrical charge 71, connected by a plug-in 66 to a power source (not shown).

Figure 18:
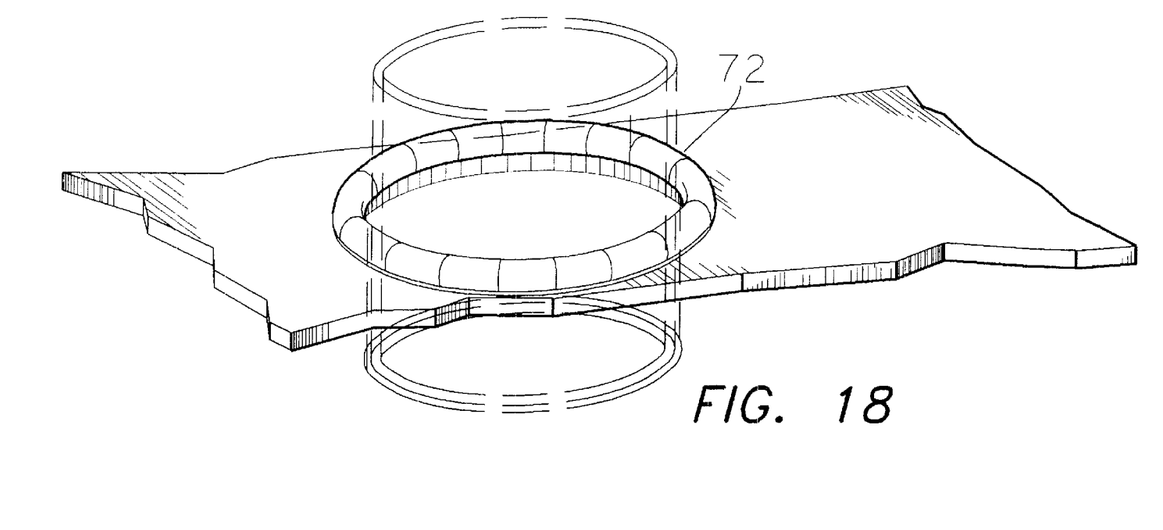
FIG. 18—is a prospective view showing a solid or liquid filled tube which glows after exposure to an outside light source as a variation of the light source.

FIG. 18 shows an alternative light source. Around the beverage container holder edge 38 is a solid (or liquid filled) tube 72 which glows after being exposed to an outside light source.

Figure 19:
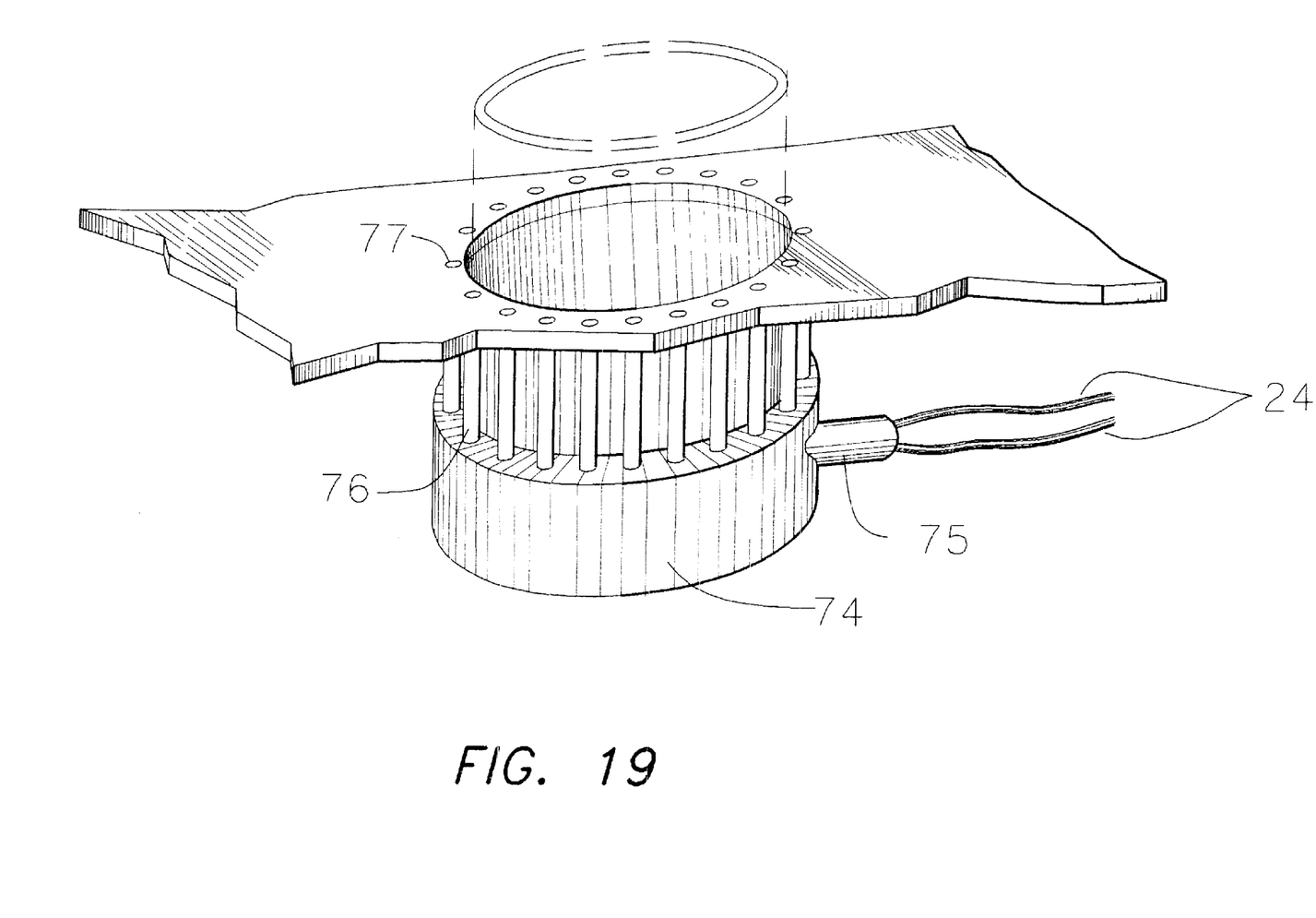
FIG. 19—is a prospective view showing a small, socket-based light source inside a reflective, vented area connected to chrome plated plastic light emitting rods which run up to holes in the console top as a variation of the light source.

FIG. 19 shows an alternative light source. Electrical leads 13 are connected to a socket-based light 75, which is connected to a ventillated light source box 74. Connected to the light source box 74 are chrome-plated, plastic light-emitting rods 76, which extend to holes 77 in the console surface 34.

Figure 20:
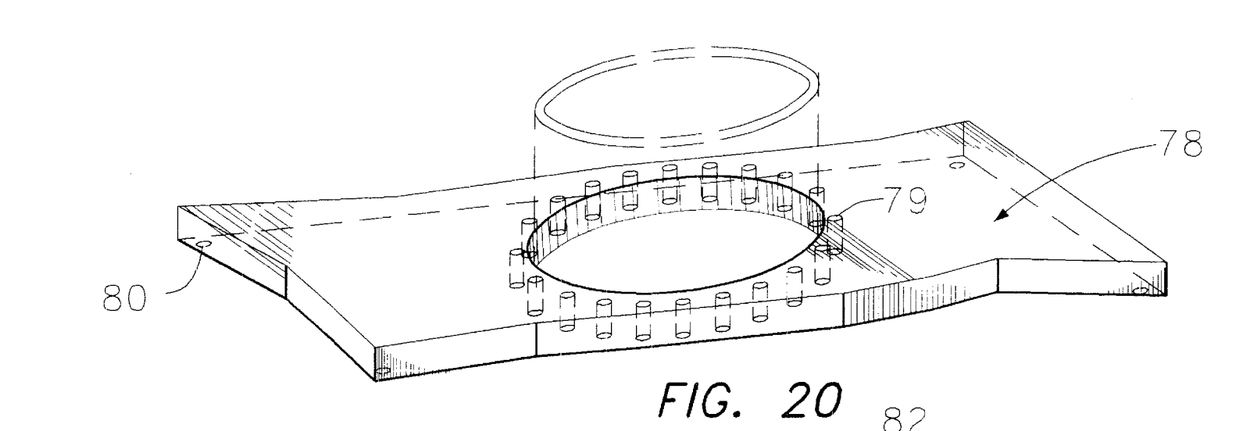
FIG. 20—Prospective view of the top-half of beverage container holder made of a semi-opaque material with holes drilled from underneath leaving $\frac{1}{16}$ of on inch of material untouched above each hole.

FIG. 20 shows an alternative light source. A semi-opaque plastic console top 78 has holes 79 in the underside that stop 1/16 of an inch from penetrating the surface. Indentations 80 on the underside of this console top 78 are used in the alignment of this piece to the bottom piece (shown in FIG. 21).

Figure 21:
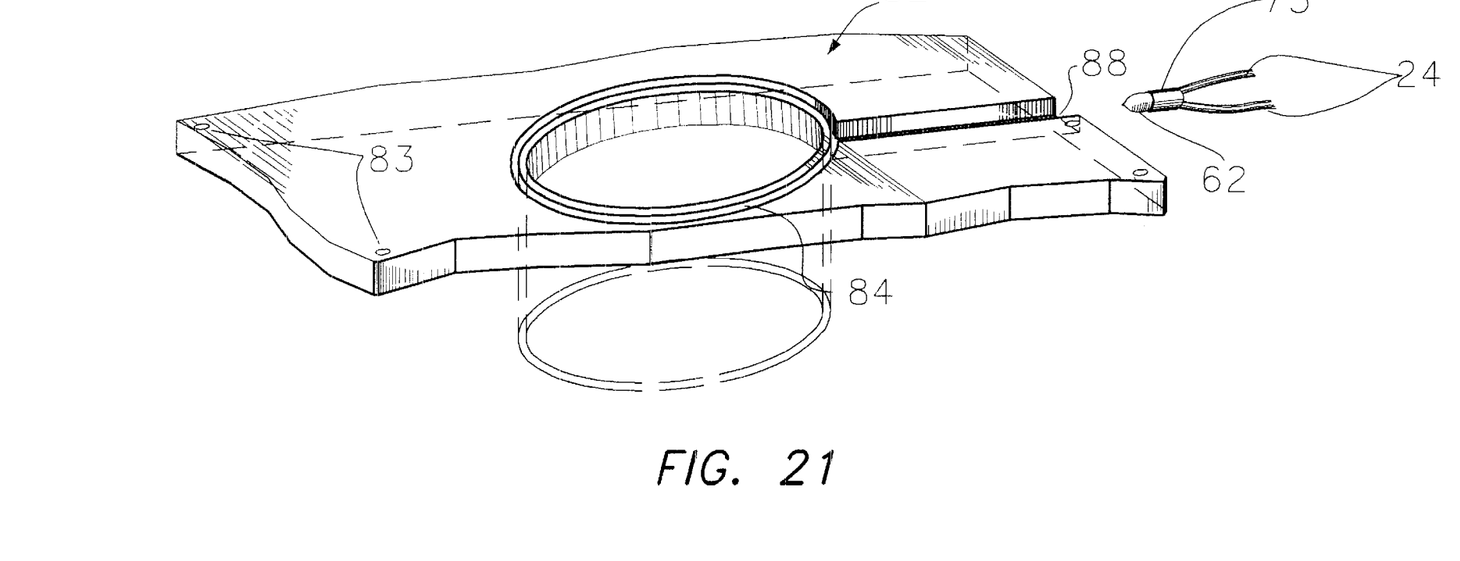
FIG. 21—Prospective view of the top-half of a beverage container holder having a light channel which extends into a chrome-plated cup holder.

FIG. 21 shows an alternative light source. Electrical leads 24 are connected to a socket base 75 which holds a small incandescent light 62. The light from this assembly is channeled through the main chromed light channel 88 into a light channel around the chrome-plated cup holder 84. The bottom of the console 82 lines up with the upper section (shown in FIG. 20) by alignment bumps 83.

FIG. 21—is a prospective view of the bottom-half of a beverage container using a chromed channel and an L.E.D. as a variation of the light source.

* Please note that FIGS. 20 and 21 are pieces of the same beverage container holder. They fit together with guiding pins and holes.

What is claimed is:

1. An automobile illuminated beverage container holder comprising:

a light source associated with the beverage holder;

said beverage holder having an opening defining an outer circumference for holding a beverage container;

a fiber optic cable mounted to an upper surface of the beverage holder;

said fiber cable surrounding the circumference of the opening of the beverage holder;

a cigarette lighter power adapter connected to the light source for powering the light source;

said light source operatively connected to the fiber optic cable for illuminating the beverage container at night.

* * * * *